Nov. 5, 1929.  M. SKOLNIK ET AL  1,734,277
ELECTRICALLY CONTROLLED SANDING DEVICE FOR AUTOMOBILES
Filed March 31, 1928
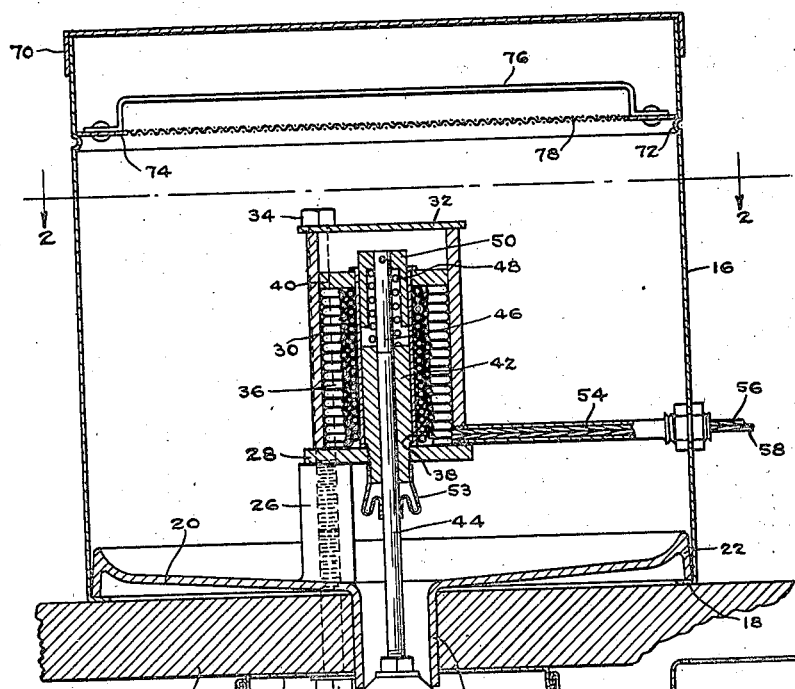
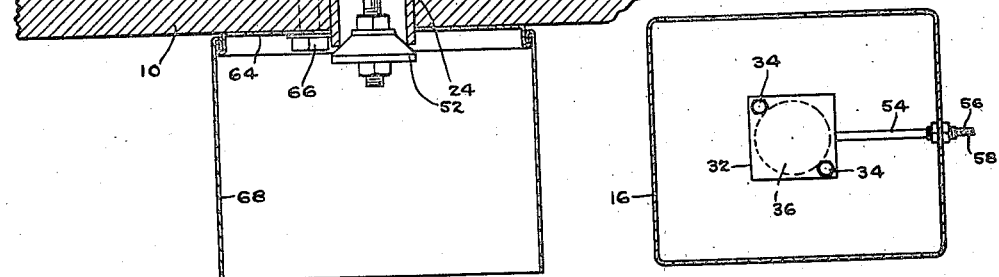
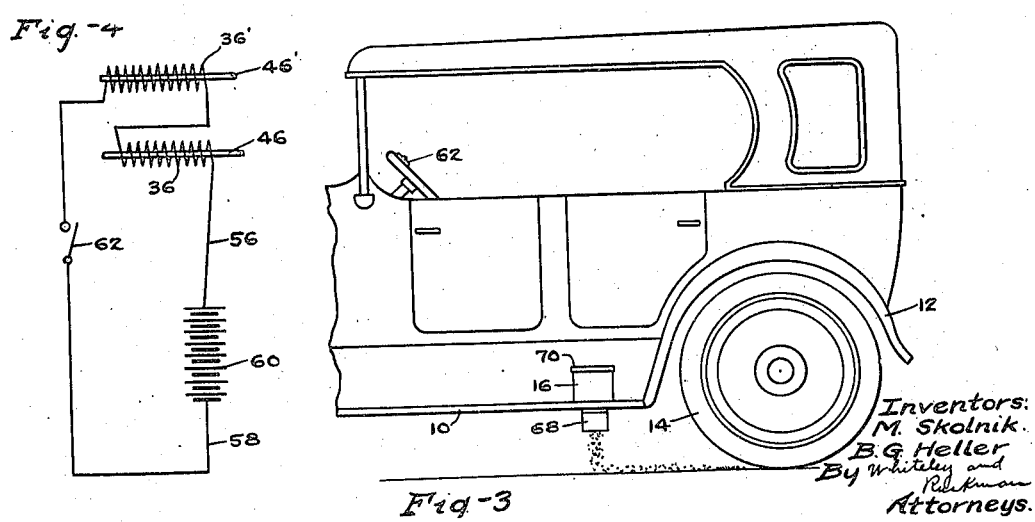

Patented Nov. 5, 1929

1,734,277

UNITED STATES PATENT OFFICE

MAX SKOLNIK AND BERNARD G. HELLER, OF MINNEAPOLIS, MINNESOTA

ELECTRICALLY-CONTROLLED SANDING DEVICE FOR AUTOMOBILES

Application filed March 31, 1928. Serial No. 266,326.

Our invention relates to electrically controlled sanding devices for automobiles, and an object of the invention is to provide for delivering sand or similar gritty material upon the roadway in front of the driving wheels of the automobile. The term "sand" will be hereinafter employed, but it is to be understood that this term will include similar gritty or abradent material. A further object of the invention is to provide a solenoid control for the delivery of such material, this control being readily operable by the driver for causing material to be delivered in front of the driving wheels whenever desired.

The full objects and advantages of our invention will appear in connection with the detailed description thereof and the novel features of my inventive idea will be particularly pointed out in the claims.

In the accompanying drawings which illustrate the application of our invention in one form, Fig. 1 is a view of the principal portion of the device in vertical section. Fig. 2 is a view in horizontal section on the line 2—2 of Fig. 1. Fig. 3 is a view on a smaller scale showing a portion of an automobile in side elevation with the device mounted on the running board. Fig. 4 is a wiring diagram view.

Referring to the construction shown in the drawings, the numeral 10 designates one of the running boards and the numeral 12 designates one of the rear fenders of an automobile positioned over one of the rear wheels 14. It will be understood as a matter of course that these members are of the same character for both sides of the automobile and that therefore our device is duplicated for both of the sides. A casing 16 constitutes the body portion of a sand receptacle, this casing having an inturned flange 18 at its lower end which is adapted to rest upon the rear portion of the running board 10. The bottom of the sand receptacle is formed by a dished member 20 which has a downturned marginal flange 22 which engages the flange 18. The central portion of the bottom member 20 is formed into a downwardly extending tube 24 which passes through an opening in the running board 10. Two hollow bosses 26 extend up from the bottom member 20 to form seats for a bottom plate 28 of a solenoid having an outer shell 30 and an upper plate 32, these parts being held together by bolts 34 which screw down into the bosses 26 which are internally threaded. A solenoid coil 36 is placed between the outer shell 30 and an inner shell 38, the upper end of the latter being below the upper end of the shell 30 with a partition 40 extending out from the upper end of the shell 38. A hollow guide member 42 is placed in the lower portion of the shell 38 and is held in place by threading it into the plate 28. A brass rod 44 fits slidably in the guide 42, the upper end of the rod 44 being joined to a steel rod 46 which constitutes the core of the solenoid. A coiled spring 48 interposed between the upper end of the guide 42 and a head 50 on the core 46 normally holds the core in upward position in which a valve 52 secured to the lower end of the rod 44 closes the lower end of the tube 24. A hollow member 53 of flexible material such as leather is secured to the lower end of the guide 42 and fits tightly around the rod 44 so as to prevent sand getting between said guide and rod. The ends of the solenoid coil 36 extend out through a tube 54 joining the shell 30 with the casing 16, the wires constituting these ends being designated 56 and 58 and being connected with a source of electricity 60 as shown in Fig. 4. As also shown in this figure, a second solenoid coil 36' having a core 46' is included in the circuit in order that similar sanding devices may be operated simultaneously at both sides of the automobile. A switch 62 in the electrical circuit is placed within reach of the driver in order that the delivery of sand may be readily controlled. An annular plate 64 is secured around the lower end of the tube 24 underneath the running board by bolts 66 threaded into the lower ends of the bosses 26. The upper end of the tubular casing 68 is secured to the periphery of the plate 64, this casing preferably being of flexible material such as cloth. A cover 70 is provided for the casing 16 in order to complete a receptacle for sand. The upper portion of the casing 16 is provided with an inwardly extending bead 72 upon which rests a ring 74 to which is attached a handle 76. A wire screen 78 is secured to the ring 74 for sifting out stones and large particles from the sand when the receptacle is filled.

The operation and advantages of our invention will be obvious in connection with the foregoing description. Upon closing the switch 62, the solenoid cores will be drawn downwardly, thus opening the valves 52 so that sand will be delivered in front of the rear wheels. When driving over slippery roadways, the driver may almost instantly release some of the sand when he wishes to stop the automobile. The release of sand also makes it easier to start the automobile by preventing spinning of the wheels and will tend to prevent skidding. The provision of the casing 68 through which the sand is delivered tends to prevent the sand from being blown away and will insure its being deposited in front of the rear wheels. When the receptacle is being filled, the screen 78 will sift out stones and large pieces which may then be removed from the screen upon lifting it out of the receptacle by means of the handle 76.

We claim:

1. An electrically controlled sanding device for automobiles comprising a receptacle for sand mounted on the running board of the automobile, a discharge pipe extending from the bottom of said receptacle through the running board, bosses extending up from said bottom within said receptacle, a solenoid coil supported by said bosses, a tubular guide in said coil, a solenoid core working in said guide and normally held in upward position, a hollow flexible member secured to the lower end of said guide and fitting tightly around said core, a valve carried by said core and normally held against the lower end of said pipe, and a switch for closing a circuit through the coil of the solenoid to open said valve.

2. An electrically controlled sanding device for automobiles comprising a receptacle for sand mounted on the automobile, a discharge pipe leading from the bottom of said receptacle to a place in front of a driving wheel of the automobile, bosses extending up from said bottom within said receptacle, a solenoid coil supported by said bosses, a tubular guide in said coil, a solenoid core working in said guide and normally held in upward position, a hollow flexible member secured to the lower end of said guide and fitting tightly around said core, a valve carried by said core and normally held against the lower end of said pipe, and a switch for closing a circuit through the coil of the solenoid to open the valve.

3. An electrically controlled sanding device for automobiles comprising a receptacle for sand mounted on the automobile, a discharge pipe leading from the bottom of said receptacle to a place in front of a driving wheel of the automobile, a solenoid coil mounted in said receptacle, a tubular guide in said coil, a solenoid core working in said guide and normally held in upward position, a hollow flexible member secured to the lower end of said guide and fitting tightly around said core, a valve carried by said core and normally held against the lower end of said pipe, and a switch for closing a circuit through the coil of the solenoid to open said valve.

4. An electrically controlled sanding device for automobiles comprising a receptacle for sand mounted on the automobile, a discharge pipe leading from the bottom of said receptacle to a place in front of a driving wheel of the automobile, a solenoid coil mounted in said receptacle, a tubular guide in said coil, a solenoid core working in said guide and normally held in upward position, a hollow flexible member secured to the lower end of said guide and fitting tightly around said core, a valve for said pipe normally held by said core in closed position, and a switch for closing a circuit through the coil of the solenoid to open said valve.

5. An electrically controlled sanding device for automobiles comprising a receptacle for sand mounted on the automobile, a discharge pipe leading from said receptacle to a place in front of a driving wheel of the automobile, a solenoid coil mounted in said receptacle, a tubular guide extending out beyond said coil, a solenoid core working in said guide, means normally holding said core in retracted position, a hollow flexible member secured to the lower end of said guide and fitting tightly around said core, a valve for said pipe normally held by said core in closed position, and a switch for closing a circuit through the coil of the solenoid to open said valve.

In testimony whereof we hereunto affix our signatures.

MAX SKOLNIK.
BERNARD G. HELLER.